United States Patent [19]
Tanno et al.

[11] Patent Number: 5,352,723
[45] Date of Patent: Oct. 4, 1994

[54] STABILIZED VINYL HALIDE COMPOSITIONS CONTAINING HYDROTALCITES

[75] Inventors: David M. Tanno, Richmond Heights, Ohio; Richard F. Grossman, Shelton, Conn.; Eric Farone, Mentor, Ohio

[73] Assignee: Synthetic Products Company, Shaker Heights, Ohio

[21] Appl. No.: 945,011

[22] Filed: Sep. 15, 1992

[51] Int. Cl.$^5$ .............................. C08K 5/04; C08K 5/09
[52] U.S. Cl. ................................... 524/399; 524/400; 524/414; 524/418; 524/424; 524/436
[58] Field of Search ............... 524/399, 400, 436, 414, 524/418, 424

[56] References Cited

U.S. PATENT DOCUMENTS

| | | | |
|---|---|---|---|
| 4,085,088 | 4/1978 | Miyata et al. | 260/45.7 R |
| 4,269,743 | 5/1981 | Hulyalkar et al. | 260/23 X |
| 4,269,744 | 5/1981 | Hulyalkar et al. | 260/23 X |
| 4,299,759 | 11/1981 | Miyata et al. | 260/45.7 R |

OTHER PUBLICATIONS

Reichle, Walter T., "Synthesis of Anionic Clay Minerals (Mixed Metal Hydroxides, Hydrotalcite), Solid States Ionics" 22 (1986) 135–141 North-Holland, Amsterdam.

*Primary Examiner*—Kriellion S. Morgan
*Attorney, Agent, or Firm*—Wood, Herron & Evans

[57] ABSTRACT

Hydrotalcites are disclosed as stabilizers for vinyl halide resins where the BET has a specific surface area of at least about 40 m$^2$/g, preferably about 50 to 60 m$^2$/g.

8 Claims, No Drawings

STABILIZED VINYL HALIDE COMPOSITIONS CONTAINING HYDROTALCITES

TECHNICAL FIELD OF THE INVENTION

This invention pertains to heat stabilizers for vinyl halide resins, in particular, hydrotalcites as heat stabilizers having a BET specific surface area of at least about 40 m$^2$/g, preferably about 50 to 60 m$^2$/g.

BACKGROUND OF THE INVENTION

It is known that treatment of mixtures of soluble aluminum and magnesium salts with aqueous blends of sodium hydroxide and carbonate will precipitate solids having an approximate empirical formula:

$$Mg_{0.7}Al_{0.3}(OH)_2(CO_3)_{0.15} \times H_2O$$

These are referred to as synthetic hydrotalcites from analogy to the naturally occurring mineral hydrotalcite having the approximate empirical formula:

$$Mg_{0.75}Al_{0.25}(OH)_2(CO_3)_{0.125} \times H_2O$$

They are derivatives of the brucite magnesium hydroxide structure, i.e., flat plates of magnesium coordinated to four oxygens in a square planar arrangement. A good discussion is given by Reichle, "Synthesis of Anionic Clay Minerals (Mixed Metal Hydroxides, Hydrotalcite)" *Solid States Ionics*, Vol. 22, 135-14 (1986). Partial replacement of magnesium in the brucite magnesium hydroxide structure by aluminum leads to an extra positive valence for each Al included. Thus each Al for Mg inclusion will accommodate one monovalent or ½ of a divalent anion. The extra anions are sandwiched between the flat magnesium/aluminum brucite layers and can be exchanged for other anions. This reaction is believed to be driven to the right by the acidic strength of the parent acid of the anion. For instance, it is likely that HCl will cause displacement of hydroxide or carbonate to form water or carbon dioxide, for example:

Synthetic hydrotalcite + HCL ⟶

$$Mg_{0.7}Al_{0.3}(OH)_2Cl_{0.3} \times H_2O + 0.15\, CO_2$$

Aluminum cannot be substituted for magnesium past a certain point or the hydrotalcite structure will collapse to a range of other mixed Mg/Al hydroxide/carbonates not having the brucite structure. It is the brucite structure that traps chloride efficiently and largely irreversibly at temperatures below 250–300° C.

The methods that can be used to make synthetic hydrotalcites are described by Miyata, et al., U.S. Pat. Nos. 4,299,759 and 4,085,088. These patents describe hydrotalcites having a BET specific surface area of not more than 30 m$^2$/g, preferably not more than 15–20 m$^2$/g as heat stabilizers for halogenated polymers. These patents also state that hydrotalcites having a specific surface area of at least, or more than, about 50 m$^2$/g should be avoided because they tend to accelerate the dechlorination of the resins under heat to cause decomposition, blackening or foaming of the resins. It is also stated that these hydrotalcites have poor dispersibility in the resins and adversely affect properties during molding and the appearance of the molded products. The useful hydrotalcites are prepared, according to Miyata, either by precipitation at room temperature and ambient pressure, followed by heat treatment with water at 150°–250° C. under pressure; or precipitation in this temperature range under pressure.

SUMMARY OF THE INVENTION

This invention is directed to a stabilized vinyl halide resin composition containing as a heat stabilizer a hydrotalcite having a BET specific surface area greater than about 40 m$^2$/g, preferably about 50 to about 60 m$^2$/g. The compositions also contain metal salt stabilizers in combination with the hydrotalcite. Surprisingly, the stabilized compositions of this invention provide equal or superior heat stabilization of halogenated polymers upon comparison with hydrotalcites described in the above Miyata patents.

DETAILED DESCRIPTION OF THE INVENTION

Hydrotalcites

The hydrotalcites of this invention are to be differentiated from the hydrotalcites described in the above Miyata U.S. Pat. Nos. 4,085,088 and 4,299,759. While the composition of the hydrotalcites remains essentially the same, as described in the above background of the invention and in the Miyata patents which are incorporated herein by reference, the distinguishing feature of the hydrotalcites of this invention is that they have a BET specific surface area greater than about 40 m$^2$/g, preferably about 50 to about 60 m$^2$/g. These hydrotalcites are made by precipitation of synthetic hydrotalcite at about 100° C. in accordance with the procedures described in the following examples.

For example, a hydrotalcite having an elemental analysis corresponding to the following formula may be used:

$$Mg_{0.7}Al_{0.3}(OH)_2(X)_{0.15} \times H_2O$$

In addition to the above hydrotalcite, analogs of the hydrotalcite have one-fourth of the magnesium, for example, replaced by zinc, may be used. Such a hydrotalcite would be represented by the following formula:

$$Mg_3ZnAl_2(OH)_{12}X \times H_2O$$

where X is a divalent anion including carbonate, sulfite, hydrogen phosphite or perchlorate.

These hydrotalcites have a flat plate brucite structure so as to be able to exchange anions for chloride within the structure and function in the vinyl halide resin stabilized compositions of this invention. The ratio of trivalent metal (usually Al) to divalent metal (usually Mg) cannot exceed 1:2 and still maintain a flat plate structure. In fact, 1:2 ratio usually cannot be reached in practice; usually 1:2.25 is the target. The trivalent metal should have an ionic radius of 0.5–0.7 angstroms and form octahedral complexes. In addition to aluminum, vanadium and titanium may structure trivalent cations. Other metal should have an ionic radius of 0.6–0.7 angstroms and form square planar (rather than tetrahedral) complexes. If this component forms tetrahedra, the result is three dimensional loops or spirals, rather than flat plates. This useful group includes Mg and Zn. Lithium is exactly the correct size and may be used. The interstitial anion may be any mono- or divalent anion (specifically, carbonate, sulfite, hydrogen, phosphite, or perchlorate) limited only by its presence not destroying the brucite structure (e.g., oxide, sulfide) or acting to lower PVC heat stability (e.g., $HSO_4$ $H_2PO_4$).

The term "hydrotalcite(s)" thus refers herein to compounds having the above empirical formulas, or equivalents, and having the brucite structure that traps chloride efficiently. These hydrotalcites are produced in accordance with the procedures hereinafter have a BET specific surface area on the order of about 60 $m^2/g$, or over a preferred range of about 50 to about 60 $m^2/g$.

Molded vinyl halide resin compositions in accordance with the principles of this invention contain as a major component a vinyl halide resin, principally polymers and copolymers of vinyl chloride such as polyvinyl chloride (PVC). PVC polymers may optionally be modified with other resins such as hydrocarbon resins. The compositions usually contain filler, at least on the order of about 10–300 parts per 100 parts of polymer. Fillers are selected from the group consisting of limestone (calcium carbonate), clay (kaolinite), talc and the like, in various fine and coarse grades or mixtures. Pigments such as titanium dioxide, plasticizers such as an ester plasticizer, or other processing additives may be included. An excellent stabilizer system includes a hydrotalcite, a metal salt or mixed salt of a fatty acid of calcium, barium, cadmium and zinc. Broad ranges of components of the vinyl halide resin compositions may be employed in the invention. Particularly useful compositions of the invention are achieved containing about 0.5 to about 5 parts of the metal salt stabilizer, about 0.5 to about 5 parts of the hydrotalcite, about 0 to about 100 parts of the usual plasticizers, at least about 10–300 parts filler, and optionally modified with hydrocarbon or other resin in a minor amount on the order of about 10 to about 50 parts, all said parts on the basis of 100 parts of vinyl halide resin.

The vinyl halide resin employed is most commonly a homopolymer of vinyl chloride, i.e., polyvinyl chloride. It is to be understood, however, that this invention is not limited to a particular vinyl halide resin such as polyvinyl chloride or its copolymers. Other halogen-containing resins which are employed and which illustrate the principles of this invention include chlorinated polyethylene, chlorinated polyvinyl chloride, and other vinyl halide resin types. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyethylene, and the like. Of course, the vinyl halide commonly used in the industry is the chloride, although others such as bromide and fluoride may be used. Examples of the latter polymers include polyvinyl bromide, polyvinyl fluoride and copolymers thereof.

The stabilizing composition of the present invention can be added by standard techniques. Thus, it can be added to the solid resin and mixed therein by means of hot rolls or other mixing machines adapted to mix solid resins for molding of the flooring tile or sheets. It can also be dispersed in a suitable solvent and then mixed with the resin, or the dispersion of the stabilizer can be mixed with a dispersion of the resin. The most important consideration is that the stabilizer and resin be thoroughly admixed and the dispersion of the stabilizer in the resin be as complete and as rapid as possible.

A preferred stabilizer composition of the present invention is comprised of two components: the first, a metal salt such as a mixed barium-zinc or calcium-zinc salt of a higher fatty acid or an antimony salt; and the second, a hydrotalcite of this invention. The salt component can also be a barium, calcium, cadmium or zinc salt of a carboxylic acid, advantageously of a $C_8-C_{24}$ carbon chain length monocarboxylic acid such as lauric, oleic or stearic acid. Mixed barium/zinc or calcium/zinc salt of such acids, and their preparation are familiar to those skilled in the art to which the present invention pertains.

The compositions of the present invention can include various additional compounds including lubricants for providing the vinyl halide resin with lubricity and plasticizers of the phthalic ester or fatty acid ester type, hydrocarbon resins or chlorinated olefins or paraffins. Other additives may include auxiliary stabilizers, antioxidants, light stabilizers, pigments, dyes or extenders ad disclosed in the above-mentioned U.S. Pat. Nos. 4,269,743 and 4,269,744. Fillers include coarse ground limestone, fine ground limestone, clay (kaolinite) talc or other particulated fillers.

The advantages of this invention and its operating parameters will be further understood with reference to the following detailed examples.

DETAILED OPERATING EXAMPLES

Example 1

A glass reactor was charged with a solution of 190.4 g sodium hydroxide and 112.4 g anhydrous sodium carbonate in 1700 ml water and brought to 100° C. A solution of 423.1 g magnesium nitrate hexahydrate and 265.2 g aluminum nitrate nonahydrate in 1250 ml water was added over a one hour period, and the reaction temperature maintained at 100° C. for an additional 4 hours, all with continuous agitation. The reactor was cooled to 65°–70° C., and the product filtered at 80 psig applied pressure. The precipitate was washed with 500 ml portions of water several times and dried 20 hours at 100° C., yielding 176.2 g of product having an elemental analysis corresponding to:

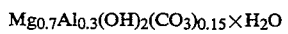

$$Mg_{0.7}Al_{0.3}(OH)_2(CO_3)_{0.15} \times H_2O$$

This product had a BET specific surface area of about 60 $m^2/g$.

Example 2

The procedure of Example 1 was repeated, charging the reactor with 421.9 g of 45% caustic soda, 125.2 g of technical grade sodium carbonate, and 1470 ml water. After bringing the reactor to 100° C., a solution of 392.4 g technical grade Epsom salt (magnesium sulfate heptahydrate) and 464.0 g "liquid alum" (aluminum sulfate solution, 4.58% Al) in 850 ml water was added over a one hour period. 100° C. was maintained for an additional 4 hours, the reactor cooled to 65°–70° C., and filtered under 80 psig applied pressure. The precipitate was washed with 500 ml portions of water several times and dried 20 hours at 100° C., yielding 178.5 g fine white powder, having an elemental analysis corresponding to the above formula of Example 1. This product had a BET specific surface area of about 60 m²/g.

Example 3

The following composition in parts was mixed on a 2-roll mill at 350° F., using a 5 min. mix cycle; PVC 100, di-2-ethylhexyl phthalate 30, calcium carbonate 10, epoxidized soybean oil 3, titanium dioxide 1, barium stearate 0.7, zinc stearate 0.3, bisphenol A 0.1., dibenzoylmethane 0.1. Samples were exposed to 390 F. in a circulating air oven and observed periodically. Substantial darkening, indicating the onset of degradation, occurred at 25 min.

Example 4

To the composition of Example 3 was added 0.5 phr of a synthetic hydrotalcite having a surface area of 13-15 m²/g, of the empirical formula $Mg_{0.7}Al_{0.3}(OH)_2\cdot(CO_3)_{0.165}$ supplied by Kyowa Chemical Corp., under the trade name "DHT-4A." Subject to the above heat aging test, this composition showed substantial darkening after 45 min, a substantial improvement over the composition of Example 3.

Example 5

To the composition of Example 3 was added, instead, 0.5 phr of the hydrotalcite product of Example 1. Subject to the above heat aging test, this composition developed substantial darkening only after 55 min. at 390° F.

Example 6

To the composition of Example 3 was added 0.5 phr of the hydrotalcite product of Example 2. This composition developed substantial darkening only after 60 min. at 390° F.

Example 7

The hydrotalcite of Example 2 was autoclaved with water at 170° C., 100 psig, for 10 hours, per the above teachings of the Miyata patents, to lower the specific surface area to the composition of Example 3 at the 0.5 phr level. The resultant composition developed substantial darkening after 40 min. at 390° F.

Having described this invention, its advantages and operating parameters it will become obvious to persons of ordinary skill in the art in view of the above description that variations thereof may be made without departing from the spirit and scope thereof.

What is claimed is:

1. A stabilized vinyl halide resin composition comprising a vinyl halide resin and as a heat stabilizer a hydrotalcite having a BET specific surface area greater than about 40 m²/g, the hydrotalcite in an effective amount to provide heat stability to said vinyl halide resin.

2. The composition of claim 1 wherein said hydrotalcite has a BET specific surface area of about 50 to about 60 m²/g.

3. The composition of claim 1 further containing a stabilizing metal salt of a higher fatty acid selected from the group consisting of calcium, zinc, barium and cadmium, and mixtures of said metal salts.

4. The composition of claim 3 wherein said hydrotalcite is present in an amount from about 0.5 to about 5 parts, said metal salt stabilizers present in an amount of from about 0.5 to about 5 parts, said parts based upon 100 parts of said resin.

5. A stabilized vinyl halide resin composition comprising a vinyl halide resin and as a heat stabilizer a hydrotalcite having a BET specific surface area of about 50 to about 60m²g the hydrotalcite in an effective amount to provide heat stability to said vinyl halide resin, and a stabilizing metal salt of a metal selected from the group consisting of calcium, zinc, barium, cadmium, and antimony, and mixtures of said metal salts.

6. The composition of claim 5 wherein said hydrotalcite is present in an amount from about 0.5 to about 5 parts, said metal salt stabilizers present in an amount of from about 0.5 to about 5 parts, said parts based upon 100 parts of said resin.

7. The composition of claim 5 wherein said hydrotalcite has the approximate empirical formula of:

$$Mg_{0.7}Al_{0.3}(OH)_2(X)_{0.15}\times H_2O$$

wherein X is a divalent anion selected from the group consisting of carbonate, sulfite, hydrogen phosphite or perchlorate.

8. The composition of claim 5 wherein said hydrotalcite has the approximate empirical formula of:

$$Mg_3ZnAl_2(OH)_{12}X\times H_2O$$

wherein X is a divalent anion selected from the group consisting of carbonate, sulfite, hydrogen phosphite or perchlorate.

* * * * *